United States Patent
Iwamoto et al.

(10) Patent No.: US 11,472,439 B2
(45) Date of Patent: Oct. 18, 2022

(54) VEHICLE CONTROL SYSTEM AND VEHICLE CONTROL METHOD

(71) Applicant: Toyota Jidosha Kabushiki Kaisha, Toyota (JP)

(72) Inventors: Takayuki Iwamoto, Shizuoka-ken (JP); Masahiro Harada, Hadano (JP); Ayako Shimizu, Numazu (JP); Akihide Tachibana, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 51 days.

(21) Appl. No.: 17/101,390

(22) Filed: Nov. 23, 2020

(65) Prior Publication Data

US 2021/0163039 A1 Jun. 3, 2021

(30) Foreign Application Priority Data

Nov. 28, 2019 (JP) .............................. JP2019-215639

(51) Int. Cl.
*B60W 50/02* (2012.01)
*B60W 60/00* (2020.01)
*B60W 40/072* (2012.01)

(52) U.S. Cl.
CPC ...... *B60W 60/0015* (2020.02); *B60W 40/072* (2013.01); *B60W 50/0205* (2013.01); *B60W 2050/021* (2013.01); *B60W 2555/00* (2020.02)

(58) Field of Classification Search
CPC ........... B60W 60/0015; B60W 40/072; B60W 50/0205; B60W 2050/021; B60W 2555/00; B60W 2552/30; B60W 60/007
See application file for complete search history.

(56) References Cited

U.S. PATENT DOCUMENTS

| 11,204,609 | B1* | 12/2021 | Ng .................... B60W 50/0225 |
| 2012/0083959 | A1* | 4/2012 | Dolgov .................... B60R 1/00 701/23 |
| 2015/0345961 | A1 | 12/2015 | Oooka et al. |
| 2016/0304089 | A1 | 10/2016 | Miura et al. |

(Continued)

FOREIGN PATENT DOCUMENTS

| JP | 2013-544697 A | 12/2013 |
| JP | 2015-228089 A | 12/2015 |

(Continued)

*Primary Examiner* — Peter D Nolan
*Assistant Examiner* — Anwar Mohamed
(74) *Attorney, Agent, or Firm* — Dinsmore & Shohl LLP

(57) ABSTRACT

A vehicle control system executes automated driving control that controls automated driving of a vehicle based on driving environment information indicating a driving environment for the vehicle. When a part of functions of the vehicle is failed during the automated driving, the vehicle control system executes emergency stop control that stops the vehicle. In the emergency stop control, the vehicle control system: acquires failure status information being information on the failed part of functions; determines, based on the failure status information and the driving environment information, a target stop position at which even the vehicle with the failed part of functions is able to arrive and stop by the automated driving; and executes the automated driving control such that the vehicle travels toward the target stop position to stop at the target stop position.

5 Claims, 15 Drawing Sheets

(56) References Cited

U.S. PATENT DOCUMENTS

| | | | |
|---|---|---|---|
| 2018/0215376 A1 | 8/2018 | Kuhara | |
| 2019/0389457 A1 | 12/2019 | Mielenz | |
| 2020/0139990 A1 | 5/2020 | Hiruma | |
| 2020/0160624 A1 | 5/2020 | Yamashita et al. | |
| 2020/0211394 A1* | 7/2020 | King | G05D 1/0077 |
| 2021/0101607 A1* | 4/2021 | Du | B60W 50/04 |
| 2021/0107498 A1* | 4/2021 | Liu | B60W 50/14 |
| 2021/0112094 A1* | 4/2021 | Liu | B60W 50/0225 |
| 2021/0139018 A1* | 5/2021 | Schwindt | H04W 4/48 |
| 2021/0139050 A1 | 5/2021 | Fujita et al. | |
| 2021/0179123 A1* | 6/2021 | Yamada | G08G 1/166 |
| 2021/0200243 A1* | 7/2021 | Chen | G05D 1/0212 |
| 2021/0291823 A1* | 9/2021 | Newman | G08G 1/16 |
| 2021/0328760 A1* | 10/2021 | Kopetz | H04L 7/04 |
| 2021/0362953 A1* | 11/2021 | Schedlbauer | B65G 1/0492 |
| 2021/0387647 A1* | 12/2021 | Koopman, Jr. | B60W 60/0016 |
| 2022/0017107 A1* | 1/2022 | Shinoda | B60W 50/029 |

FOREIGN PATENT DOCUMENTS

| | | |
|---|---|---|
| JP | 2016-203691 A | 12/2016 |
| JP | 2017-157067 A | 9/2017 |
| JP | 2018-122650 A | 8/2018 |
| JP | 2018-193038 A | 12/2018 |
| JP | 2019-008540 A | 1/2019 |
| JP | 2019-137321 A | 8/2019 |
| JP | 2020-082918 A | 6/2020 |
| JP | 2021-075186 A | 5/2021 |
| WO | 2012/047980 A2 | 4/2012 |
| WO | 2018/103937 A1 | 6/2018 |
| WO | 2019/026469 A1 | 2/2019 |

\* cited by examiner

VEHICLE CONTROL SYSTEM AND VEHICLE CONTROL METHOD

CROSS-REFERENCE TO RELATED APPLICATION

This application claims priority to Japanese Patent Application No. 2019-215639 filed Nov. 28, 2019, the contents of which is incorporated by reference herein in its entirety.

BACKGROUND

Technical Field

The present disclosure relates to a vehicle control technique for controlling a vehicle. In particular, the present disclosure relates to a vehicle control technique including automated driving control for controlling automated driving of a vehicle.

Background Art

Patent Literature 1 discloses a control device of an automated driving vehicle. A memory unit of the control device stores a first scheduled parking position being a position at which the automated driving vehicle is scheduled to be parked. In addition, the control device determines a no-parking area based on image information imaged by an imaging unit. The control device determines, based on the first scheduled parking position and the no-parking area, whether or not it is possible to park the automated driving vehicle at the first scheduled parking position. When it is not possible to park the automated driving vehicle at the first scheduled parking position, the control device changes a position at which the automated driving vehicle is to be parked to a second scheduled parking position. Then, the control device sets a route to the second scheduled parking position and controls movement of the automated driving vehicle based on the route.

Patent Literature 2 discloses an automated driving control device. The automated driving control device has a security safeguard system that executes automated driving control of automated driving level 2 and an automated driving system that executes automated driving control of automated driving level 3. When the security safeguard system is failed during execution of the automated driving control by the security safeguard system, the automated driving control transitions to the one executed by the automated driving system. On the contrary, when the automated driving system is failed during execution of the automated driving control by the automated driving system, the automated driving control transitions to the one executed by the security safeguard system.

LIST OF RELATED ART

Patent Literature 1: Japanese Laid-Open Patent Application Publication No. JP-2018-122650

Patent Literature 2: Japanese Laid-Open Patent Application Publication No. JP-2017-157067

SUMMARY

When a failure occurs in a vehicle during automated driving, it is conceivable to execute emergency stop control that stops the vehicle. A case where the method described in the above Patent Literature 1 is applied to the emergency stop control is considered as a comparative example.

According to the technique described in the above Patent Literature 1, the no-parking area is determined based on the image information imaged by the imaging unit. Then, whether or not the vehicle can be parked at a predetermined position is determined based on the no-parking area. However, when a failure occurs in the vehicle, it is insufficient to determine whether the vehicle can be parked at the predetermined position based only on the image information. The reason is that, depending on the failed function, a motion performance and the like of the vehicle may be limited and thus the automated driving may become difficult to perform as intended. When the automated driving is not performed as intended, the vehicle may not be able to arrive at the predetermined position or stop at the predetermined position.

An object of the present disclosure is to provide a technique that can stop a vehicle at an appropriate position when a part of functions of the vehicle is failed during automated driving.

A first aspect is directed to a vehicle control system that controls a vehicle.

The vehicle control system includes:

a memory in which driving environment information indicating a driving environment for the vehicle is stored; and a processor.

The processor is programmed to:

execute automated driving control that controls automated driving of the vehicle based on the driving environment information; and execute emergency stop control that stops the vehicle, when a part of functions of the vehicle is failed during the automated driving.

In the emergency stop control, the processor is further programmed to:

acquire failure status information being information on the failed part of functions;

determine, based on the failure status information and the driving environment information, a target stop position at which even the vehicle with the failed part of functions is able to arrive and stop by the automated driving; and execute the automated driving control such that the vehicle travels toward the target stop position to stop at the target stop position.

A second aspect further has the following feature in addition to the first aspect.

The driving environment information includes map information.

A stop candidate area being a candidate for an area at which the vehicle is made stop when a failure occurs in the vehicle is registered in the map information.

The processor determines the target stop position such that the target stop position is included in the stop candidate area registered in the map information.

A third aspect further has the following feature in addition to the second aspect.

A priority is set for each stop candidate area.

A high-priority area is the stop candidate area whose priority is a first priority.

A low-priority area is the stop candidate area whose priority is a second priority lower than the first priority.

When both the high-priority area and the low-priority area are qualified to be the target stop position, the processor determines the target stop position such that the target stop position is included in the high-priority area.

A fourth aspect further has the following feature in addition to the third aspect.

A road curvature in the high-priority area is lower than a road curvature in the low-priority area.

A fifth aspect further has the following feature in addition to the third aspect.

A margin width is a difference between a vehicle width of the vehicle and a road width of a road area through which another vehicle traveling in a same direction as the vehicle is able to pass.

The margin width in the high-priority area is larger than the margin width in the low-priority area.

A sixth aspect further has the following feature in addition to the third aspect.

The high-priority area and the low-priority area around an intersection change according to a lane in which the vehicle exists before entering the intersection.

A seventh aspect further has the following feature in addition to any one of the first to sixth aspects.

The processor is further programmed to:

acquire vehicle performance information indicating a performance of the vehicle with the failed part of functions indicated by the failure status information; and determine, based on the performance of the vehicle and the driving environment information, the target stop position at which the vehicle with the failed part of functions is able to arrive and stop by the automated driving.

An eighth aspect is directed to a vehicle control method for controlling a vehicle.

The vehicle control method includes:

executing automated driving control that controls automated driving of the vehicle based on driving environment information indicating a driving environment for the vehicle; and executing emergency stop control that stops the vehicle, when a part of functions of the vehicle is failed during the automated driving.

Executing the emergency stop control includes:

acquiring failure status information being information on the failed part of functions;

determining, based on the failure status information and the driving environment information, a target stop position at which even the vehicle with the failed part of functions is able to arrive and stop by the automated driving; and executing the automated driving control such that the vehicle travels toward the target stop position to stop at the target stop position.

According to the first aspect, when a part of functions of the vehicle is failed during the automated driving, the vehicle control system acquires the failure status information regarding the failed function. The vehicle control system determines a target stop position at which even the vehicle with the failed function indicated by the failure status information is able to arrive and stop by the automated driving. Then, the vehicle control system executes the automated driving control such that the vehicle travels toward and stops at the determined target stop position. It is thus possible to stop the vehicle at an appropriate target stop position in the case of the failure occurrence. In other words, it is possible to appropriately execute the emergency stop control.

According to the second aspect, the target stop position is determined by referring to the stop candidate area registered in the map information. Therefore, a more appropriate target stop position is obtained. Moreover, referring to the stop candidate area registered in the map information makes it possible to narrow a search range for the target stop position. This may be preferable from a viewpoint of reduction in processing load and processing time of the processor.

According to the third aspect, it is possible to stop the vehicle at the high-priority target stop position. In other words, it is possible to further appropriately execute the emergency stop control.

According to the fourth aspect, the vehicle is stopped at the high-priority area with good visibility, and thus safeties of the stopped vehicle and surrounding vehicles are improved.

According to the fifth aspect, the vehicle is stopped at the high-priority area with a large margin width, and thus another vehicle is able to travel more smoothly.

According to the sixth aspect, the high-priority area and the low-priority area around an intersection change according to a lane in which the vehicle exists before entering the intersection. It is thus possible to more finely determine the target stop position according to a situation at the time of the failure occurrence.

According to the seventh aspect, it is possible to appropriately determine the target stop position based on the performance of the vehicle in which the failure occurs.

According to the eighth aspect, the same effect as in the case of the first aspect can be obtained.

EMBODIMENTS

Embodiments of the present disclosure will be described below with reference to the attached drawings.

1. First Embodiment 1-1. Outline

Figure 1:
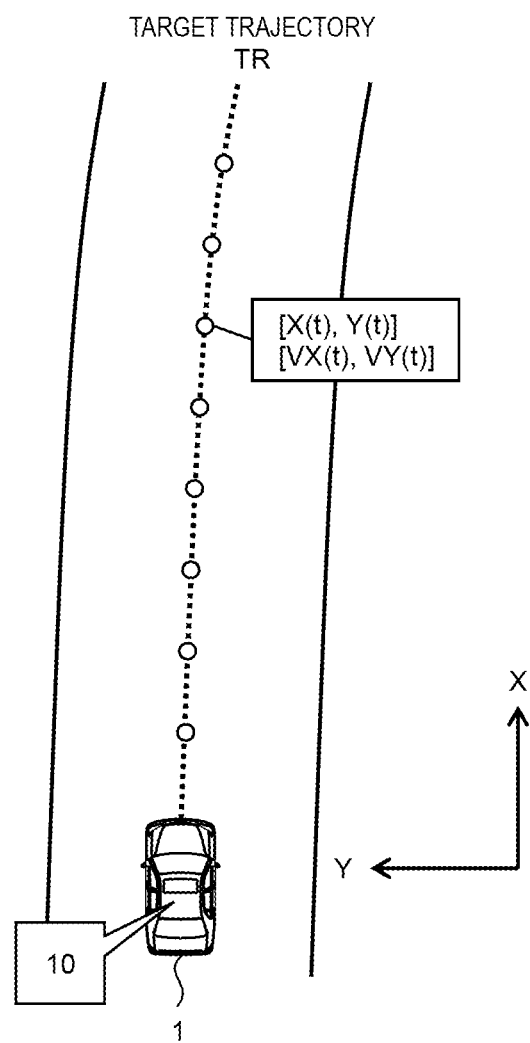
FIG. 1 is a conceptual diagram for explaining an outline of a vehicle control system according to a first embodiment of the present disclosure.

FIG. 1 is a conceptual diagram for explaining an outline of a vehicle control system 10 according to the first embodiment. The vehicle control system 10 controls a vehicle 1. Typically, the vehicle control system 10 is installed on the vehicle 1. Alternatively, at least a part of the vehicle control system 10 may be placed in an external device outside the vehicle 1 and remotely control the vehicle 1. That is, the vehicle control system 10 may be distributed in the vehicle 1 and the external device.

The vehicle 1 is an automated driving vehicle capable of automated driving. The automated driving here means that steering, acceleration, and deceleration of the vehicle 1 are performed automatically independent of a driver's operation. The vehicle control system 10 executes "automated driving control" that controls automated driving of the vehicle 1.

In the automated driving control, a target trajectory TR is typically used. The target trajectory TR includes target positions [X(t), Y(t)] and target velocities [VX(t), VY(t)] in a road on which the vehicle 1 travels. In the example shown in FIG. 1, an X-direction is a forward direction of the vehicle 1, and a Y-direction is a plane direction orthogonal to the X-direction. However, the coordinate system (X, Y) is not limited to the example shown in FIG. 1. The target position [X(t), Y(t)] and the target velocity [VX(t), VY(t)] each is a function of time t. The target velocity [VX(t), VY(t)] may be set for each target position [X(t), Y(t)]. In other words, the target position [X(t), Y(t)] and the target velocity [VX(t), VY(t)] may be associated with each other. The vehicle control system 10 executes the automated driving control by controlling travel (i.e., steering, acceleration, and deceleration) of the vehicle 1 such that the vehicle 1 follows the target trajectory TR.

Next, a case where a failure occurs in the vehicle 1 during the automated driving is considered. If the failure occurs, the automated driving may become difficult to continue depending on the failure status. In view of the above, when a part of functions of the vehicle 1 is failed during the automated driving, the vehicle control system 10 executes "emergency stop control" that stops the vehicle 1.

Figure 2:
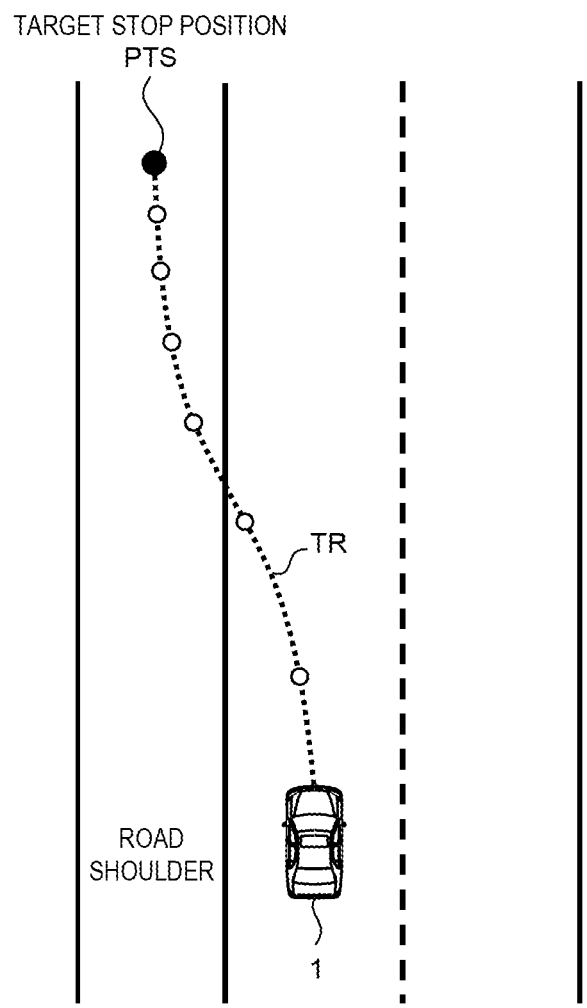
FIG. 2 is a conceptual diagram for explaining emergency stop control according to the first embodiment of the present disclosure.

FIG. 2 is a conceptual diagram for explaining the emergency stop control. A target position at which the vehicle 1 is to be stopped in the emergency stop control is hereinafter referred to as a "target stop position PTS." The vehicle control system 10 determines (sets) the target stop position PTS. Then, the vehicle control system 10 executes the automated driving control such that the vehicle 1 travels toward the target stop position PTS to stop at the target stop position PTS. The automated driving control (emergency stop control) here includes at least deceleration control, and may further include steering control as necessary. Typically, the vehicle control system 10 generates a target trajectory TR (emergency stop trajectory) along which the vehicle 1 travels from a current position toward the target stop position PTS and stops at the target stop position PTS. Then, the vehicle control system 10 controls travel of the vehicle 1 such that the vehicle 1 follows the generated target trajectory TR.

In the example shown in FIG. 2, the target stop position PTS and the target trajectory TR are set so as to evacuate the vehicle 1 to a road shoulder. The road shoulder may be beforehand registered in map information or may be detected by a sensor (e.g., a camera) installed on the vehicle 1. It should be noted that the target stop position PTS is not limited to the road shoulder.

According to the present embodiment, what function of the vehicle 1 is failed is taken into consideration in determining the target stop position PTS. The reason is that, depending on the failed function, a motion performance and a sensor performance of the vehicle 1 may be limited and thus the automated driving may become difficult to perform as intended. When the automated driving is not performed as intended, the vehicle 1 may not be able to arrive at the target stop position PTS or stop at the target stop position PTS. On the other hand, considering the failed function makes it possible to determine an appropriate target stop position PTS at which even the vehicle 1 with the failed function is able to arrive and stop by the automated driving.

More specifically, when a part of functions of the vehicle 1 is failed during the automated driving, the vehicle control system 10 acquires "failure status information" indicating the failed function. Typically, the failure status information indicates a component (part, site) where the failure occurs. Here, the component means a device or an equipment providing some function to the vehicle 1. Examples of the component include a steering device, a driving device, a braking device, a sensor, a communication device, a light, an air conditioner, and so forth. The failure status information may further indicate a degree (level) of the failure.

The vehicle control system 10 determines a target stop position PTS at which even the vehicle 1 with the failed function indicated by the failure status information is able to arrive and stop by the automated driving. For example, the vehicle control system 10 sets an "ineffective stop area AIN" and an "effective stop area AEF" based on the failure status information. The ineffective stop area AIN is an area at which the vehicle 1 with the failed function indicated by the failure status information is not able to arrive and stop. On the other hand, the effective stop area AEF is an area at which even the vehicle 1 with the failed function indicated by the failure status information is able to arrive and stop. The vehicle control system 10 determines the target stop position PTS within the effective stop area AEF.

Figure 3:
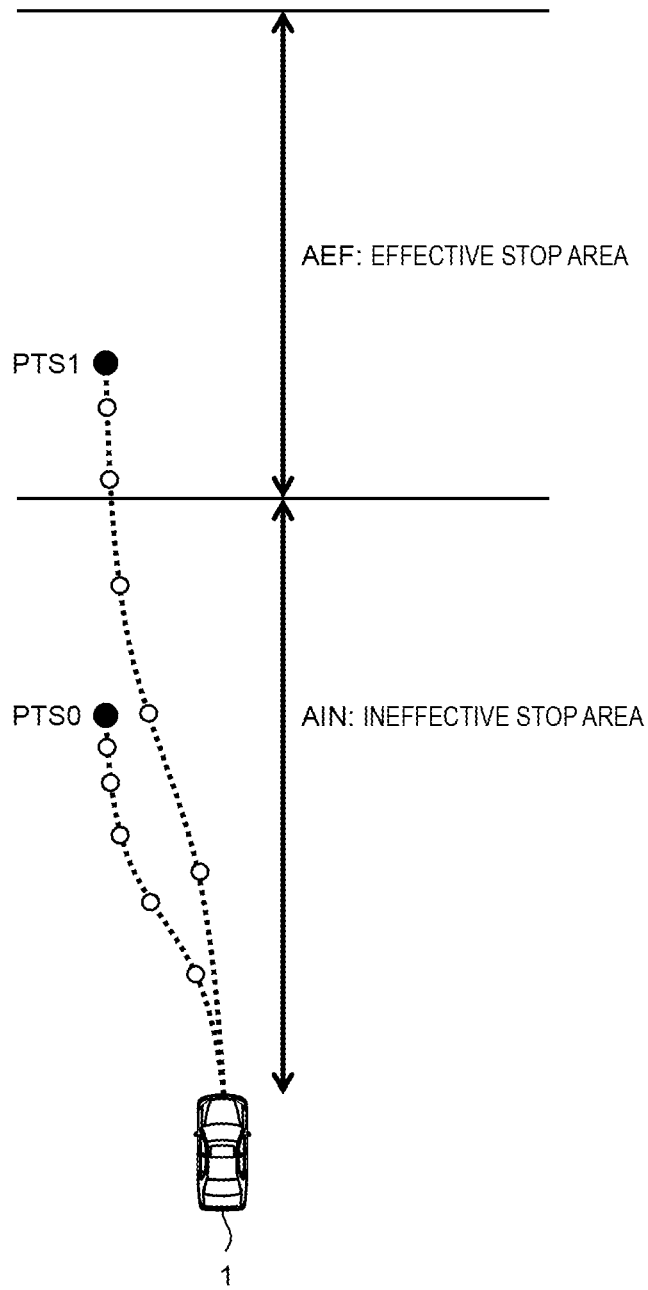
FIG. 3 is a conceptual diagram for explaining an example of the emergency stop control according to the first embodiment of the present disclosure.

An example of determining the target stop position PTS will be described with reference to FIG. 3. In FIG. 3, let us consider a situation where the braking device of the vehicle 1 is failed. The failure status information indicates that the braking device is failed. A backup braking device may operate when the braking device is failed. However, a deceleration performance (a maximum deceleration) is decreased and a braking distance is increased as compared with a normal status.

If the braking device is not failed, the vehicle 1 is able to sufficiently decelerate before a target stop position PTS0 and stop at the target stop position PTS0. However, in the situation where the braking device is failed, the deceleration performance is decreased and thus the vehicle 1 is not able to stop at the target stop position PTS0. Therefore, the vehicle control system 10 determines a target stop position PTS1 at which even the vehicle 1 whose braking device is failed is able to stop as the target stop position PTS.

In the example shown in FIG. 3, the ineffective stop area AIN is an area at which the vehicle 1 whose braking device is failed is not able to stop. On the other hand, the effective stop area AEF is an area at which even the vehicle 1 whose braking device is failed is able to stop. The vehicle control system 10 calculates the ineffective stop area AIN and the effective stop area AEF based on a position, an orientation, a speed, a motion performance (e.g., a maximum steering angle, a maximum deceleration that can be achieved by the backup braking device), and the like of the vehicle 1. Then, the vehicle control system 10 determines the target stop position PTS (PTS1) within the effective stop area AEF. Needless to say, when there is an obstacle such as a parked vehicle in the effective stop area AEF, the target stop position PTS is determined so as to avoid the obstacle.

It should be noted that the effective stop area AEF need not extend to infinite distance. For example, a maximum allowable time is set in advance with regard to a time from the failure occurrence to stop of the vehicle 1. A size of the effective stop area AEF is set such that the vehicle 1 is able to arrive and stop within the maximum allowable time.

Figure 4:
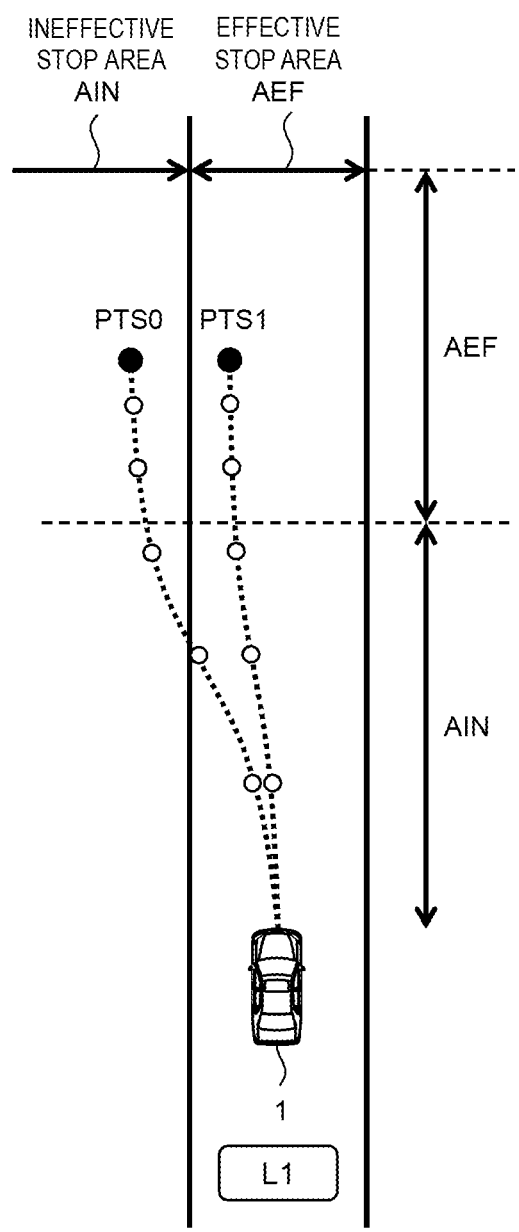
FIG. 4 is a conceptual diagram for explaining another example of the emergency stop control according to the first embodiment of the present disclosure.

Another example of determining the target stop position PTS will be described with reference to FIG. 4. In FIG. 4, let us consider a situation where a radar installed on the vehicle 1, especially a left radar for recognizing a situation in a left direction of the vehicle 1 is failed. The failure status information indicates that the left radar is failed. When the left radar is failed, a recognition performance in the left direction is decreased as compared with the normal status. Therefore, for security, it may be preferable not to perform an evacuation behavior toward a left-side road shoulder and a lane change to the left direction.

In the example shown in FIG. 4, a travel lane in which the vehicle 1 currently travels is a lane L1. If the left radar is not failed, it is allowed to execute the automated driving control such that the vehicle 1 departs from the lane L1 in the left direction to stop at a target stop position PTS0. However, in the situation where the left radar is failed, it may not be preferable to execute the automated driving control such that the vehicle 1 departs from the lane L1 in the left direction. Therefore, the vehicle control system 10 determines a target stop position PTS1 within the lane L1 at which the vehicle 1 is able to safely stop as the target stop position PTS.

In the example shown in FIG. 4, the ineffective stop area AIN is an area at which the vehicle 1 whose left radar is failed is not able to arrive. On the other hand, the effective stop area AEF is an area at which even the vehicle 1 whose left radar is failed is able to arrive and stop. The vehicle control system 10 calculates the ineffective stop area AIN and the effective stop area AEF based on lane information as well as the position, the orientation, the speed, the motion performance (e.g., the maximum steering angle, the maximum deceleration), and the like of the vehicle 1. Then, the vehicle control system 10 determines the target stop position PTS (PTS1) within the effective stop area AEF.

Figure 5:
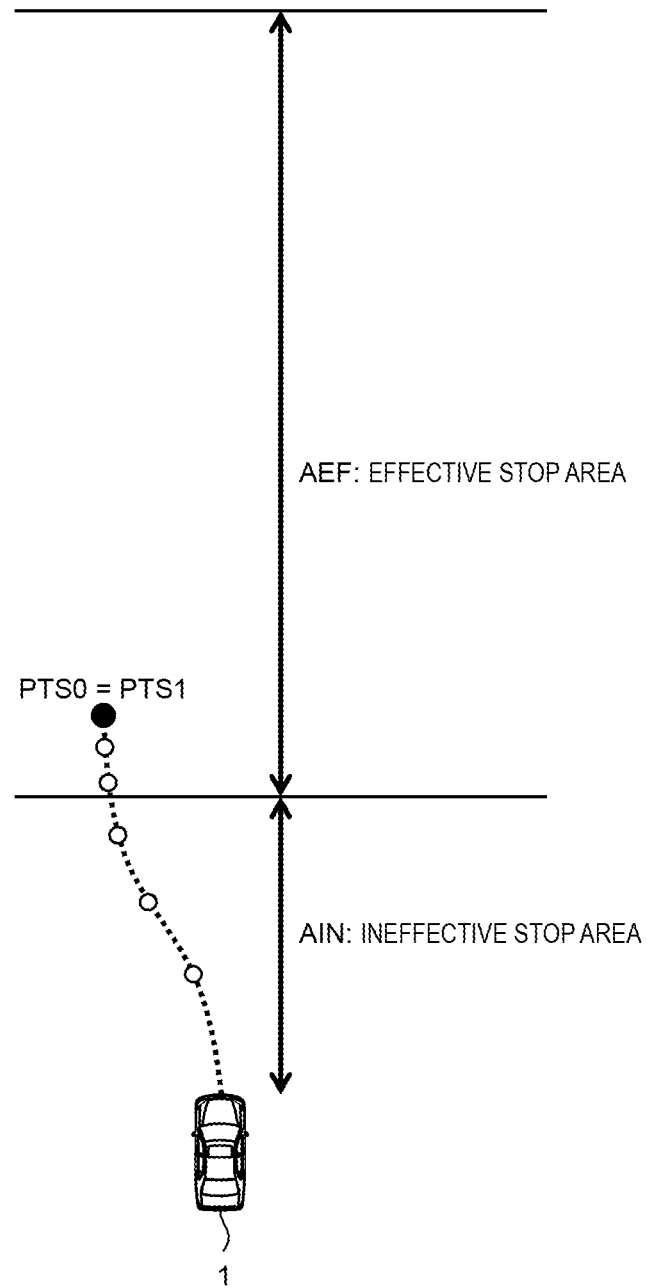
FIG. 5 is a conceptual diagram for explaining still another example of the emergency stop control according to the first embodiment of the present disclosure.

Still another example of determining the target stop position PTS will be described with reference to FIG. 5. In FIG. 5, let us consider a situation where a communication device installed on the vehicle 1 is failed. The failure status information indicates that the communication device is failed. Unlike in the cases of the above-described FIGS. 3 and 4, the motion performance and the recognition performance of the vehicle 1 do not change even when the communication device is failed. Therefore, the target stop position PTS to be determined results in the same (PTS0=PTS1), although the failure of the communication device is taken into account.

In the example shown in FIG. 5, the ineffective stop area AIN is an area at which the vehicle 1 whose communication device is failed is not able to arrive and stop. On the other hand, the effective stop area AEF is an area at which even the vehicle 1 whose communication device is failed is able to arrive and stop. The vehicle control system 10 calculates the ineffective stop area AIN and the effective stop area AEF based on the position, the orientation, the speed, the motion performance, and the like of the vehicle 1. Then, the vehicle control system 10 determines the target stop position PTS (PTS1) within the effective stop area AEF.

As described above, according to the present embodiment, when a part of functions of the vehicle 1 is failed during the automated driving, the vehicle control system 10 acquires the failure status information regarding the failed function. The vehicle control system 10 determines the target stop position PTS at which even the vehicle 1 with the failed function indicated by the failure status information is able to arrive and stop by the automated driving. Then, the vehicle control system 10 executes the automated driving control such that the vehicle 1 travels toward and stops at the determined target stop position PTS. It is thus possible to stop the vehicle 1 at an appropriate target stop position PTS in the case of the failure occurrence. In other words, it is possible to appropriately execute the emergency stop control.

Hereinafter, the vehicle control system 10 according to the present embodiment will be described in more detail.

1-2. Configuration Example

Figure 6:
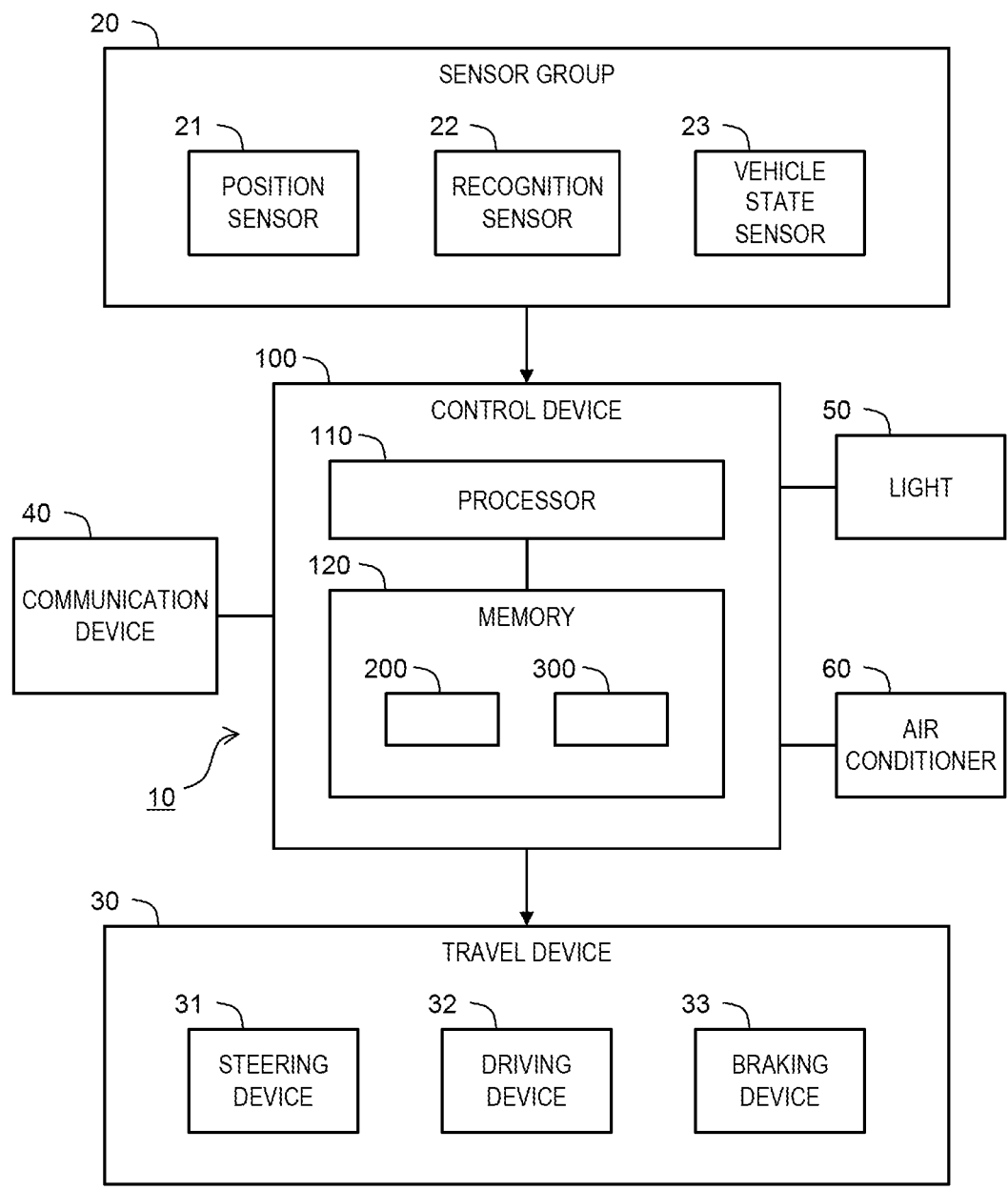
FIG. 6 is a block diagram showing a configuration example of a vehicle and the vehicle control system according to the first embodiment of the present disclosure.

FIG. 6 is a block diagram showing a configuration example of the vehicle 1 and the vehicle control system 10 according to the present embodiment. The vehicle 1 includes a sensor group 20, a travel device 30, a communication device 40, a light 50, an air conditioner 60, and a control device (controller) 100. The vehicle control system 10 includes at least the control device 100. The vehicle control system 10 may further include the sensor group 20, the travel device 30, the communication device 40, and the like.

The sensor group 20 includes a position sensor 21, a recognition sensor 22, a vehicle state sensor 23, and the like. The position sensor 21 detects a position and an orientation of the vehicle 1. The position sensor 21 is exemplified by a GPS (Global Positioning System) sensor. The recognition sensor 22 detects a situation around the vehicle 1. Examples of the recognition sensor 22 include a camera, a LIDAR (Laser Imaging Detection and Ranging), a radar, a sonar, and the like. The vehicle state sensor 23 detects a state of the vehicle 1. Examples of the vehicle state sensor 23 include a vehicle speed sensor, a yaw rate sensor, a lateral acceleration sensor, a steering angle sensor, a steering torque sensor, an accelerator pedal sensor, a brake sensor, and the like.

The travel device 30 includes a steering device 31, a driving device 32, and a braking device 33. The steering device 31 turns (i.e., changes a direction of) a wheel of the vehicle 1. For example, the steering device 31 includes a power steering (EPS: Electric Power Steering) device. The driving device 32 is a power source that generates a driving force. The driving device 32 is exemplified by an engine, an electric motor, an in-wheel motor, and the like. The braking device 33 generates a braking force. In preparation for failure, each device may have a redundant configuration. In the case of the redundant configuration, a backup device operates when a main device is failed.

The communication device 40 communicates with the outside of the vehicle 1. For example, the communication device 40 communicates with a management server outside of the vehicle 1 via a communication network. The communication device 40 may perform V2I communication (vehicle-to-infrastructure communication) with a surrounding infrastructure. The communication device 40 may perform V2V communication (vehicle-to-vehicle communication) with a surrounding vehicle.

The light 50 illuminates a space ahead of the vehicle 1. The air conditioner 60 controls a room temperature of the vehicle 1.

The control device (controller) 100 controls the vehicle 1. Typically, the control device 100 is a microcomputer provided with a processor 110 and a memory 120. The control device 100 is also called an ECU (Electronic Control Unit). A variety of information is stored in the memory 120. Examples of the memory 120 include a volatile memory, a non-volatile memory, an HDD (Hard Disk Drive), and the like. The processor 110 executes a variety of processes. The variety of processes by the control device 100 is achieved by the processor 110 executing a control program being a computer program. The control program is stored in the memory device 120 or recorded on a computer-readable recording medium.

For example, the control device 100 (i.e., the processor 110) acquires driving environment information 200 indicating a driving environment for the vehicle 1. The driving environment information 200 is stored in the memory 120.

Figure 7:
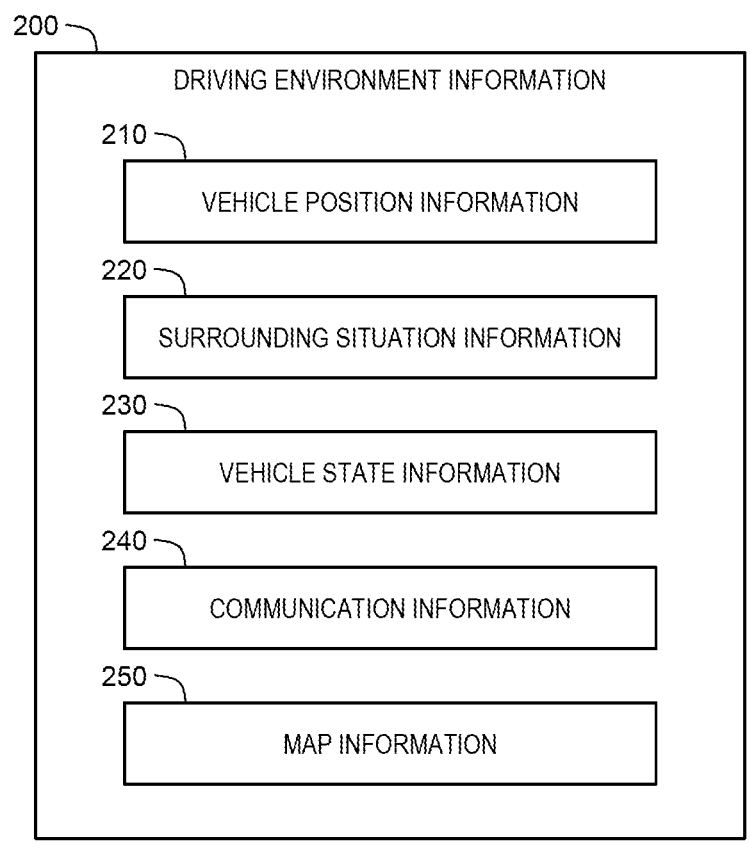
FIG. 7 is a block diagram showing an example of driving environment information in the first embodiment of the present disclosure.

FIG. 7 is a block diagram showing an example of the driving environment information 200. The driving environment information 200 includes vehicle position information 210, surrounding situation information 220, vehicle state information 230, communication information 240, map information 250, and so forth.

The vehicle position information 210 is information indicating the position and the orientation of the vehicle 1, and is acquired from a result of detection by the position sensor 21.

The surrounding situation information 220 is information indicating the situation around the vehicle 1, and is acquired from a result of detection by the recognition sensor 22. Typically, the surrounding situation information 220 includes a relative position and a relative speed of an object around the vehicle 1. Examples of the object around the vehicle 1 include a surrounding vehicle (e.g., a preceding vehicle, a following vehicle, and the like), a pedestrian, a roadside structure, a white line, and the like.

The vehicle state information 230 is information indicating the state of the vehicle 1, and is acquired from a result of detection by the vehicle state sensor 23. Examples of the state of the vehicle 1 include a vehicle speed, a yaw rate, a lateral acceleration, a steering angle, a steering torque, and the like.

The communication information 240 is information acquired via the communication device 40. For example, the communication information 240 includes surrounding vehicle information and road traffic information. The control device 100 acquires the communication information 240 by communicating with the outside via the communication device 40.

The map information 250 indicates a lane configuration, a road shape, and the like. The control device 100 acquires the map information 250 of a necessary area from a map database. The map database may be stored in a predetermined storage device installed on the vehicle 1, or may be stored in a management server outside the vehicle 1. In the latter case, the control device 100 communicates with the management server via the communication device 40 to acquire the necessary map information 250.

Moreover, the control device 100 (i.e., the processor 110) executes "vehicle travel control" that controls steering, acceleration, and deceleration of the vehicle 1. The control device 100 executes the vehicle travel control by controlling an operation of the travel device 30. More specifically, the control device 100 controls the steering (turning of the wheel) of the vehicle 1 by controlling an operation of the steering device 31. The control device 100 controls the acceleration of the vehicle 1 by controlling an operation of the driving device 32. The control device 100 controls the deceleration of the vehicle 1 by controlling an operation of the braking device 33.

The vehicle travel control includes the automated driving control. The control device 100 (i.e., the processor 110) executes the automated driving control based on the driving environment information 200. More specifically, the control device 100 generates a travel plan of the vehicle 1 during the automated driving. The travel plan includes maintaining a current travel lane, making a lane change, avoiding an obstacle, and so forth. Further, the control device 100 generates, based on the driving environment information 200, the target trajectory TR for the vehicle 1 to travel in accordance with the travel plan. Then, the control device 100 executes the vehicle travel control such that the vehicle 1 follows the target trajectory TR.

Furthermore, the control device 100 (i.e., the processor 110) executes the emergency stop control described above. That is, when a part of functions of the vehicle 1 is failed during the automated driving, the control device 100 executes the automated driving control to stop the vehicle 1. Hereinafter, processing related to the emergency stop control will be described in more detail.

1-3. Emergency Stop Control

Figure 8:
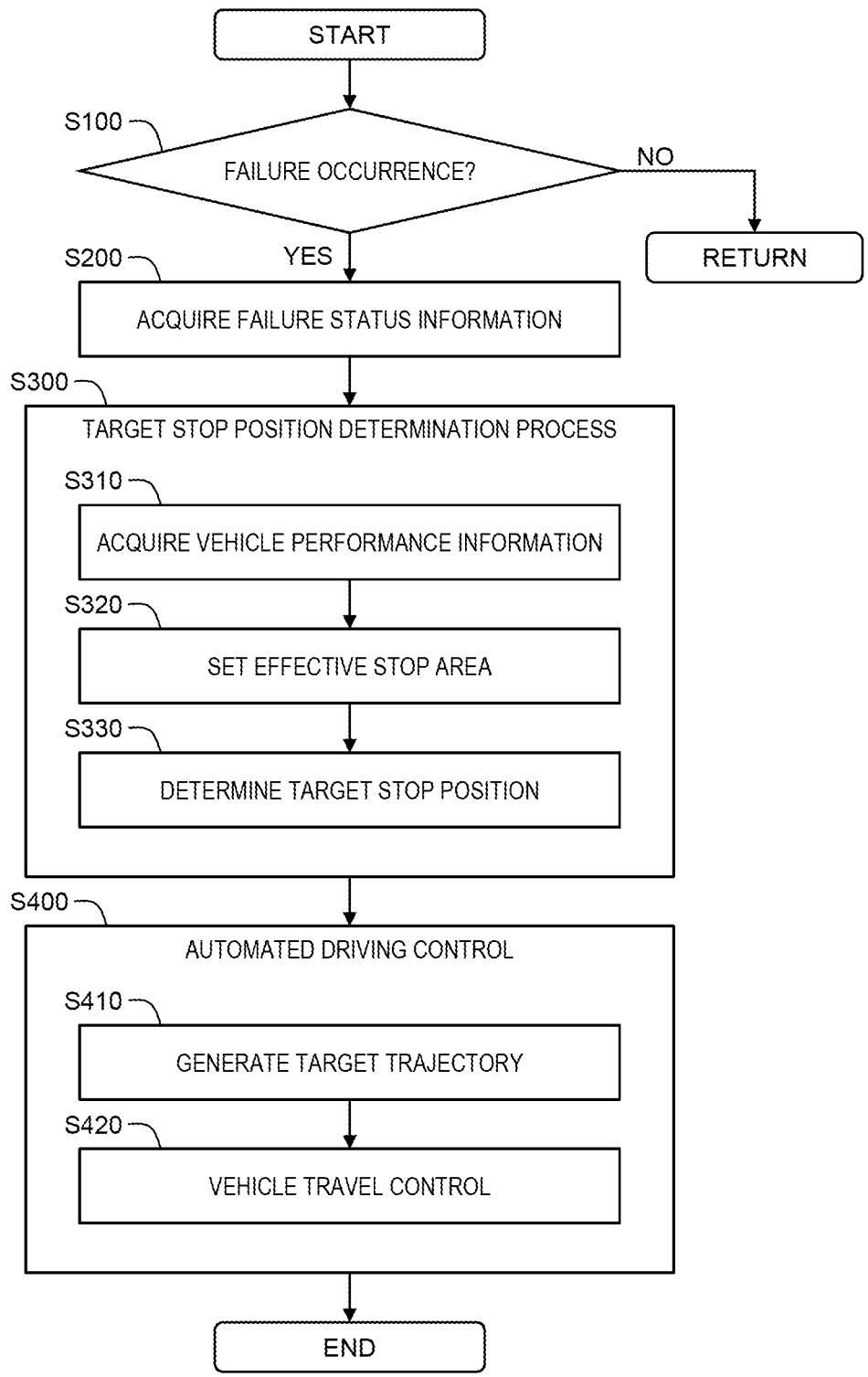
FIG. 8 is a flow chart showing processing related to the emergency stop control according to the first embodiment of the present disclosure.

FIG. 8 is a flow chart showing the processing related to the emergency stop control according to the present embodiment. Here, the vehicle 1 is in automated driving, and the automated driving control is in execution by the control device 100.

In Step S100, the control device 100 determines whether or not a failure occurs in the vehicle 1. For example, the control device 100 has a failure diagnosis function. The control device 100 utilizes the failure diagnosis function to determine whether or not each component of the vehicle 1 is failed. Examples of the component of the vehicle 1 include the position sensor 21, the recognition sensor 22, the vehicle state sensor 23, the steering device 31, the driving device 32, the braking device 33, the communication device 40, the light 50, the air conditioner 60, and so forth.

As another example, each sensor of the sensor group 20 may detect a failure occurrence by using its own failure diagnosis function. The sensor detecting the failure occurrence sends an error code to the control device 100. By receiving the error code, the control device 100 recognizes the failure or the sensor. Alternatively, when the control device 100 does not receive an output signal from a sensor for a certain period of time, the control device 100 may determine that the sensor s failed.

When no failure occurs (Step S100; No), the processing in the current cycle ends. On the other hand, when a failure occurs (Step S100; Yes), the processing proceeds to Step S200.

In Step S200, the control device 100 acquires failure status information 300 indicating the failed function. Typically, the failure status information 300 indicates a component where the failure occurs. The failure status information 300 may further indicate a degree (level) of the failure. The failure status information 300 is stored in the memory 120. After that, the processing proceeds to Step S300.

In Step S300, the control device 100 executes a target stop position determination process that determines the target stop position PTS based on the driving environment information 200 and the failure status information 300.

More specifically, in Step S310, the control device 100 acquires vehicle performance information based on the failure status information 300. The vehicle performance information indicates a performance of the vehicle 1 with the failed function indicated by the failure status information 300. Here, examples of the performance of the vehicle 1 include a motion performance and a sensor performance.

The motion performance includes a maximum steering angle, a maximum acceleration, and a maximum deceleration. The maximum steering angle is acquired from a performance specification of the steering device 31. The maximum acceleration is acquired form a performance specification of the driving device 32. The maximum deceleration is acquired from a performance specification of the braking device 33. Failures of the steering device 31, the driving device 32, and the braking device 33 affect the maximum steering angle, the maximum acceleration, and the maximum deceleration, respectively. Typically, the failures of the steering device 31, the driving device 32, and the braking device 33 decrease the maximum steering angle, the maximum acceleration, and the maximum deceleration, respectively.

The sensor performance is a performance of each sensor included in the sensor group 20. For example, the sensor performance includes a recognition performance of the recognition sensor 22. The recognition performance depends on a type, a number, and a cover range of the recognition sensor 22. A failure of the recognition sensor 22 decreases the recognition performance. For example, a failure of the left radar decreases the recognition performance in the left direction (see FIG. 4). In addition, a failure of the light 50 during the night also decreases the recognition performance.

In Step S320, the control device 100 sets the effective stop area AEF and the ineffective stop area AIN based on the driving environment information 200 and the vehicle performance information (see FIGS. 3, 4, and 5). The effective stop area AEF is an area at which even the vehicle 1 whose performance is decreased due to the failure is able to arrive and stop. The ineffective stop area AIN is an area at which the vehicle 1 whose performance is decreased due to the failure is not able to arrive and stop. The control device 100 calculates the effective stop area AEF and the ineffective stop area AIN based on the position, the orientation, the speed, the acceleration, the motion performance, the sensor performance, and the like of the vehicle 1. The position and the orientation of the vehicle 1 are acquired from the vehicle position information 210. The speed and the acceleration of the vehicle 1 are acquired from the vehicle state information 230. The motion performance and the sensor performance of the vehicle 1 are acquired from the vehicle performance information.

It should be noted that the effective stop area AEF need not extend to infinite distance. For example, a maximum allowable time is set in advance with regard to a time from the failure occurrence to stop of the vehicle 1. A size of the effective stop area AEF is set such that the vehicle 1 is able to arrive and stop within the maximum allowable time.

In Step S330, the control device 100 determines the target stop position PTS within the effective stop area AEF. The control device 100 may set a position within the effective stop area AEF and closest to the current position of the vehicle 1 as the target stop position PTS. When there is an obstacle such as a parked vehicle in the effective stop area AEF, the target stop position PTS is determined so as to avoid the obstacle. A position of the obstacle is obtained from the surrounding situation information 220.

An example of the target stop position PTS when the braking device 33 is failed is as shown in FIG. 3. An example of the target stop position PTS when the left radar among the recognition sensor 22 is failed is as shown in FIG. 4. When the steering device 31 is failed, the target stop position PTS may be set as in the case of FIG. 4. When a left light of the light 50 is failed during the night, the target stop position PTS may be set as in the case of FIG. 4. An example of the target stop position PTS when the communication device 40 is failed is as shown in FIG. 5. When the air conditioner 60 is failed, the target stop position PTS may be set as in the case of FIG. 5.

After the target stop position PTS is determined in Step S300, the processing proceeds to Step S400.

In Step S400, the control device 100 executes the automated driving control such that the vehicle 1 travels toward the target stop position PTS to stop at the target stop position PTS. More specifically, the control device 100 generates a target trajectory TR along which the vehicle 1 travels from the current position toward the target stop position PTS and stops at the target stop position PTS (Step S410). Then, the control device 100 controls travel of the vehicle 1 such that the vehicle 1 follows the generated target trajectory TR (Step S420).

1-4. Effects

As described above, according to the present embodiment, when a part of functions of the vehicle 1 is failed during the automated driving, the control device 100 acquires the failure status information 300 regarding the failed function. The control device 100 determines the target stop position PTS at which even the vehicle 1 with the failed function indicated by the failure status information 300 is able to arrive and stop by the automated driving. Then, the control device 100 executes the automated driving control such that the vehicle 1 travels toward and stops at the determined target stop position PTS. It is thus possible to stop the vehicle 1 at an appropriate target stop position PTS in the case of the failure occurrence. In other words, it is possible to appropriately execute the emergency stop control.

2. Second Embodiment

In a second embodiment, a "stop candidate area AC" is beforehand registered in the map information 250. The stop candidate area AC is a candidate for an area at which the vehicle 1 is made stop when a failure occurs. In the emergency stop control, the control device 100 refers to the map information 250 to determine the target stop position PTS so as to be included in the stop candidate area AC.

Figure 9:
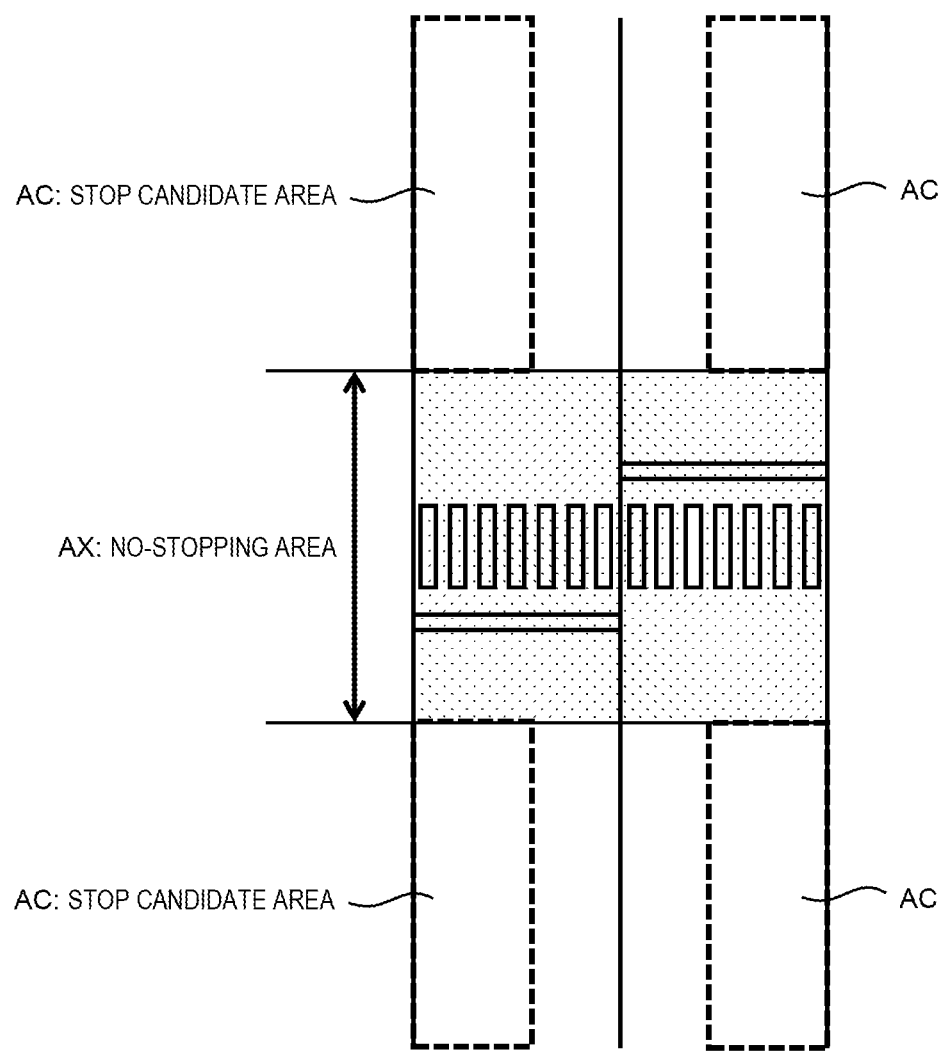
FIG. 9 is a conceptual diagram for explaining an example of a stop candidate area in a second embodiment of the present disclosure.
Figure 10:
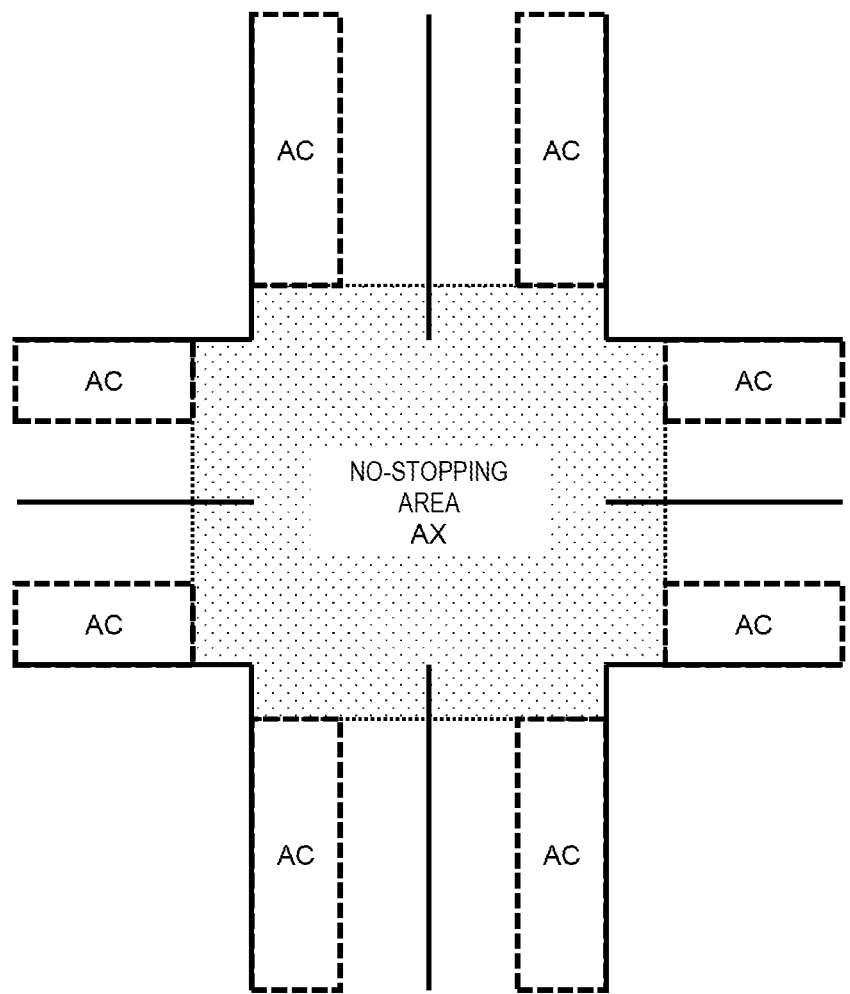
FIG. 10 is a conceptual diagram for explaining another example of the stop candidate area in the second embodiment of the present disclosure.

FIGS. 9 and 10 are conceptual diagrams for explaining an example of the stop candidate area AC. In order to explain the stop candidate area AC, a "no-stopping area AX" is first described. The no-stopping area AX is an area in which parking of vehicles is prohibited, and is defined in Road Traffic Act and the like. In the example shown in FIG. 9, the no-stopping area AX includes an area of a predetermined width on and around a pedestrian crossing. In the example shown in FIG. 10, the no-stopping area AX includes an area of a predetermined width on and around an intersection. Besides, an area in front of a fire department also is included in the no-stopping area AX. Such the no-stopping area AX also may be registered in the map information 250 in advance.

The stop candidate area AC is selected from an area on roads other than the no-stopping area AX. Typically, the stop candidate area AC is a part of the area other than the no-stopping area AX. For example, the stop candidate area AC is selected from a viewpoint of security of the stopped vehicle 1. As exemplified in FIGS. 9 and 10, the stop candidate area AC may be an area relatively close to a road edge. In one example, the stop candidate area AC is set to include a road shoulder or a side strip.

Figure 11:
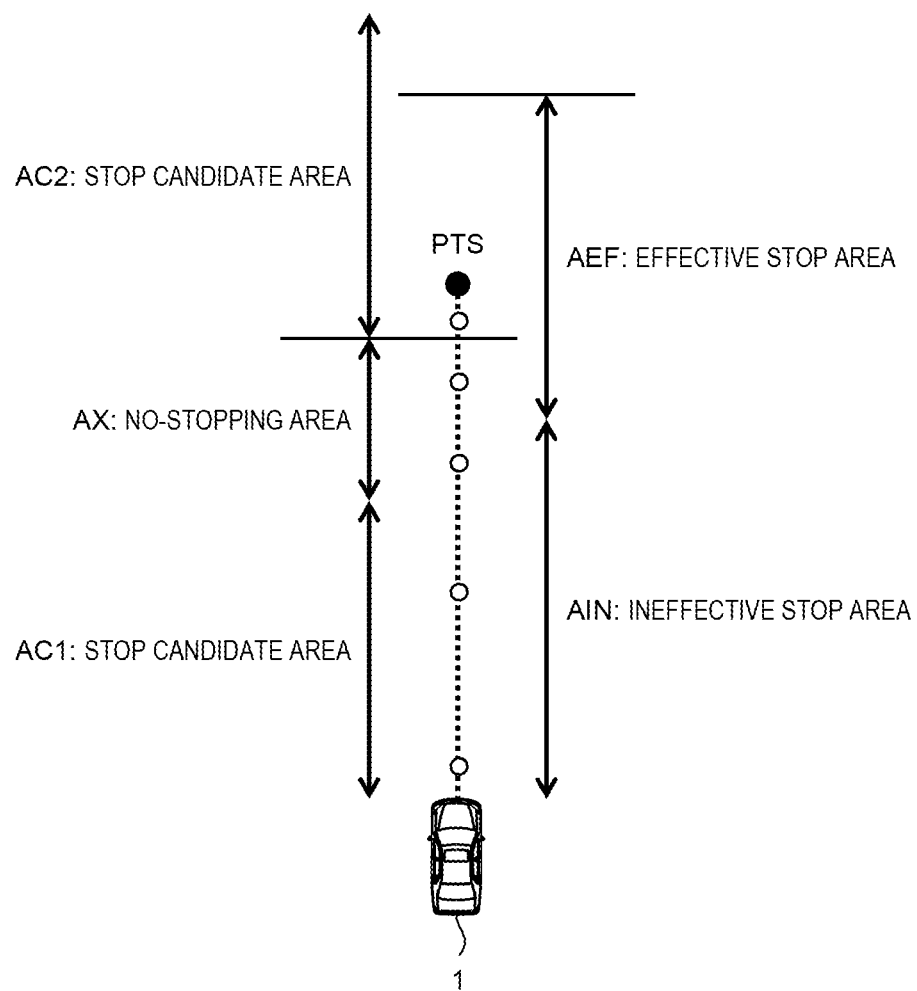
FIG. 11 is a conceptual diagram for explaining a method for determining a target stop position in the second embodiment of the present disclosure.

FIG. 11 is a conceptual diagram for explaining a method for determining the target stop position PTS in the present embodiment. The control device 100 determines the target stop position PTS such that the target stop position PTS is included in the stop candidate area AC registered in the map information 250. More specifically, the control device 100 determines (selects) the target stop position PTS within an overlapping area where the stop candidate area AC and the effective stop area AEF overlap with each other.

In the example shown in FIG. 11, two stop candidate areas AC1 and AC2 are illustrated. The stop candidate area AC1 is included in the ineffective stop area AIN and does not overlap the effective stop area AEF. On the other hand, the stop candidate area AC2 overlaps the effective stop area AEF. The target stop position PTS is included in an area where the stop candidate area AC2 and the effective stop area AEF overlap with each other.

For example, the control device 100 calculates the effective stop area AEF and then reads the stop candidate area AC2 overlapping the effective stop area AEF from the map information 250. Alternatively, the control device 100 may read the stop candidate areas AC1 and AC2 from the map information 250 and then calculate the effective stop area AEF within the stop candidate areas AC1 and AC2.

According to the present embodiment, the target stop position PTS is determined by referring to the stop candidate area AC registered in the map information 250. Therefore, a more appropriate target stop position PTS is obtained. For example, the target stop position PTS is prevented from belonging to the no-stopping area AX. Moreover, referring to the stop candidate area AC registered in the map information 250 makes it possible to narrow a search range for the target stop position PTS. This may be preferable from a viewpoint of reduction in processing load and processing time of the control device 100 (i.e., the processor 110).

3. Third Embodiment

In a third embodiment, a priority is set for each stop candidate area AC. That is, the stop candidate area AC is registered in the map information 250 in association with the priority. In the emergency stop control, the control device 100 determines the target stop position PTS such that the target stop position PTS is included in the stop candidate area AC of highest possible priority.

For the sake of explanation, two kinds of stop candidate areas AC having different priorities are considered. A "high-priority area ACH" is the stop candidate area AC whose priority is a first priority. A "low-priority area ACL" is the stop candidate area AC whose priority is a second priority lower than the first priority. When both the high-priority area ACH and the low-priority area ACL are qualified to be the target stop position PTS (the effective stop area AEF), the control device 100 determines the target stop position PTS such that the target stop position PTS is included in the high-priority area ACH. As a result, it is possible to stop the vehicle 1 at the high-priority target stop position PTS. In other words, it is possible to further appropriately execute the emergency stop control.

Hereinafter, various examples of setting of the high-priority area ACH and the low-priority area ACL in the present embodiment will be described.

3-1. First Example

Figure 12:
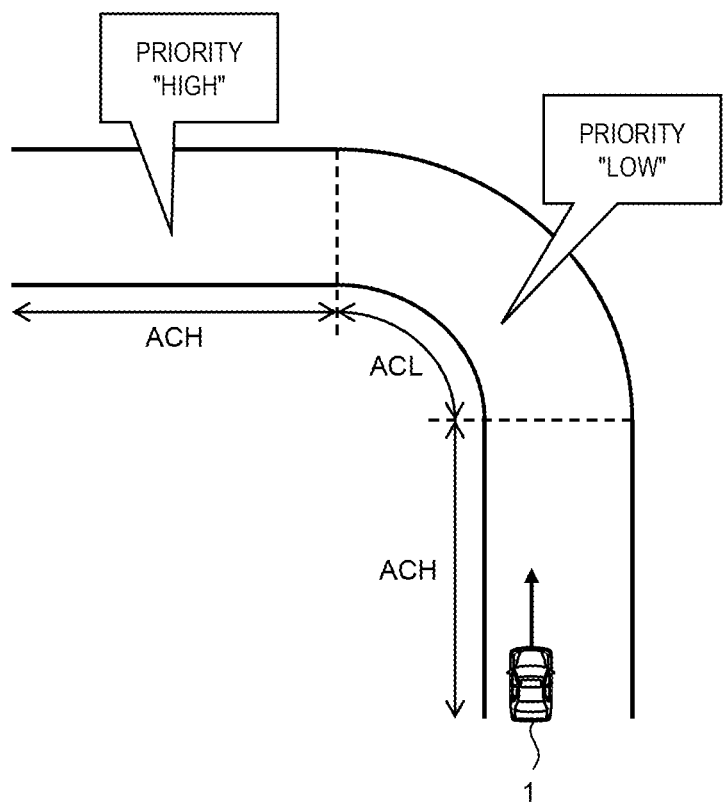
FIG. 12 is a conceptual diagram for explaining a first example of setting of a high-priority area and a low-priority area in a third embodiment of the present disclosure.

FIG. 12 shows a first example of setting of the high-priority area ACH and the low-priority area ACL. In the first example, the priority is set in terms of a road structure. More specifically, a straight section is set as the high-priority area ACH, and a curve section is set as the low-priority area ACL. To generalize, a road curvature in the high-priority area ACH is lower than a road curvature in the low-priority area ACL. Since the vehicle 1 is stopped at the high-priority area ACH with good visibility, safeties of the stopped vehicle 1 and surrounding vehicles are improved.

Similarly, the high-priority area ACH and the low-priority area ACL may be set based on a road gradient. A road gradient in the high-priority area ACH is lower than a road gradient in the low-priority area ACL.

3-2. Second Example

Figure 13:
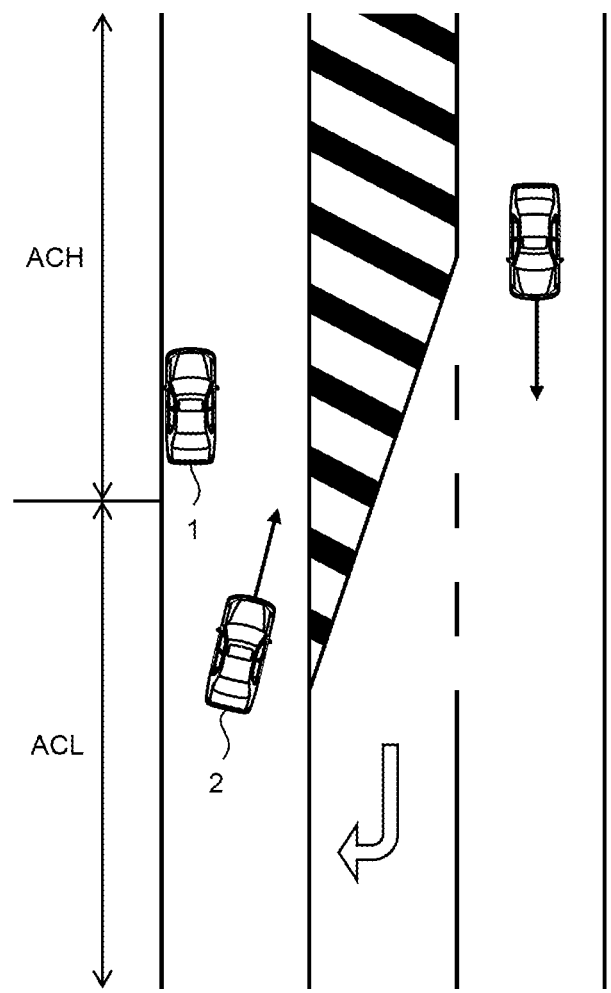
FIG. 13 is a conceptual diagram for explaining a second example of setting of the high-priority area and the low-priority area in the third embodiment of the present disclosure.

FIG. 13 shows another example of setting of the high-priority area ACH and the low-priority area ACL. In a second example, the priority is set in terms of smoothness of traffic flow when the vehicle 1 is stopped. For example, as shown in FIG. 13, when the vehicle 1 is stopped at an area adjacent to a channelizing strip, another vehicle 2 traveling in a same direction as the vehicle 1 is able to avoid the vehicle 1 with a sufficient margin. Therefore, an area adjacent to a channelizing strip with a width to some extent is set as the high-priority area ACH.

To generalize, a margin width WM is a difference between a vehicle width W1 of the vehicle 1 and a road width W2 of a road area through which another vehicle 2 traveling in the same direction as the vehicle 1 is able to pass (WM=W2−W1). The larger the margin width WM is, the higher the priority is. That is to say, the margin width WM in the high-priority area ACH is larger than the margin width WM in the low-priority area ACL. For example, an area where the margin width WM is equal to or larger than a threshold Wth is set as the high-priority area ACH, and an area where the margin width WM is smaller than the threshold Wth is set as the low-priority area ACL.

The road width W2 is obtained from the map information 250. The vehicle width W1 of the vehicle 1 is assumed to be a predetermined value, for example. Under that assumption, the priority is set and registered in the map information 250.

As another example, vehicle width information indicating an actual vehicle width W1 of the vehicle 1 may be prepared.

In this case, the control device 100 variably sets the priority (i.e., the high-priority area ACH and the low-priority area ACL) based on the map information 250 and the vehicle width information. For instance, a priority when the vehicle width W1 is assumed to be a predetermined value is registered as a standard priority in the map information 250. The control device 100 increases or decreases the priority from the standard priority according to the actual vehicle width W1 indicated by the vehicle width information. For example, the high-priority area ACH with respect to a large-sized vehicle such as a truck is smaller than the high-priority area ACH with respect to a standard-sized vehicle.

According to the second example, the vehicle 1 is stopped at the high-priority area ACH with the large margin width WM, and thus another vehicle 2 is able to travel more smoothly.

3-3. Third Example

In a third example, a situation where the failure occurs at before an intersection is considered. In many cases, there are various types of lanes before the intersection. Examples of the various types of lanes include a straight lane, a left-turn lane, a straight/left-turn lane, and a right-turn lane. A direction in which the vehicle 1 should proceed changes depending on which lane the vehicle 1 exists. Therefore, the high-priority area ACH and the low-priority area ACL around an intersection dynamically change according to a lane in which the vehicle 1 exists before entering the intersection.

Figure 14:
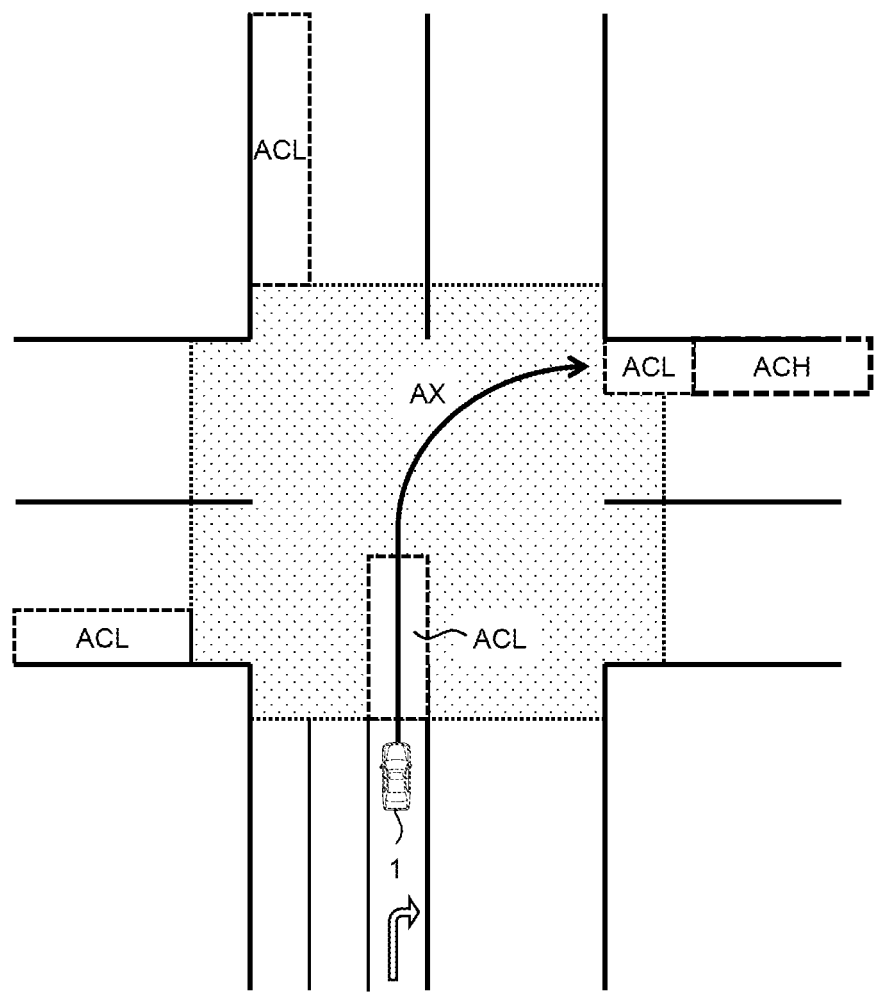
FIG. 14 is a conceptual diagram for explaining a third example of setting of the high-priority area and the low-priority area in the third embodiment of the present disclosure.

For example, FIG. 14 shows a case where the vehicle 1 exists in a right-turn lane before an intersection. In this case, the high-priority area ACH is set within a right-turn destination lane.

Figure 15:
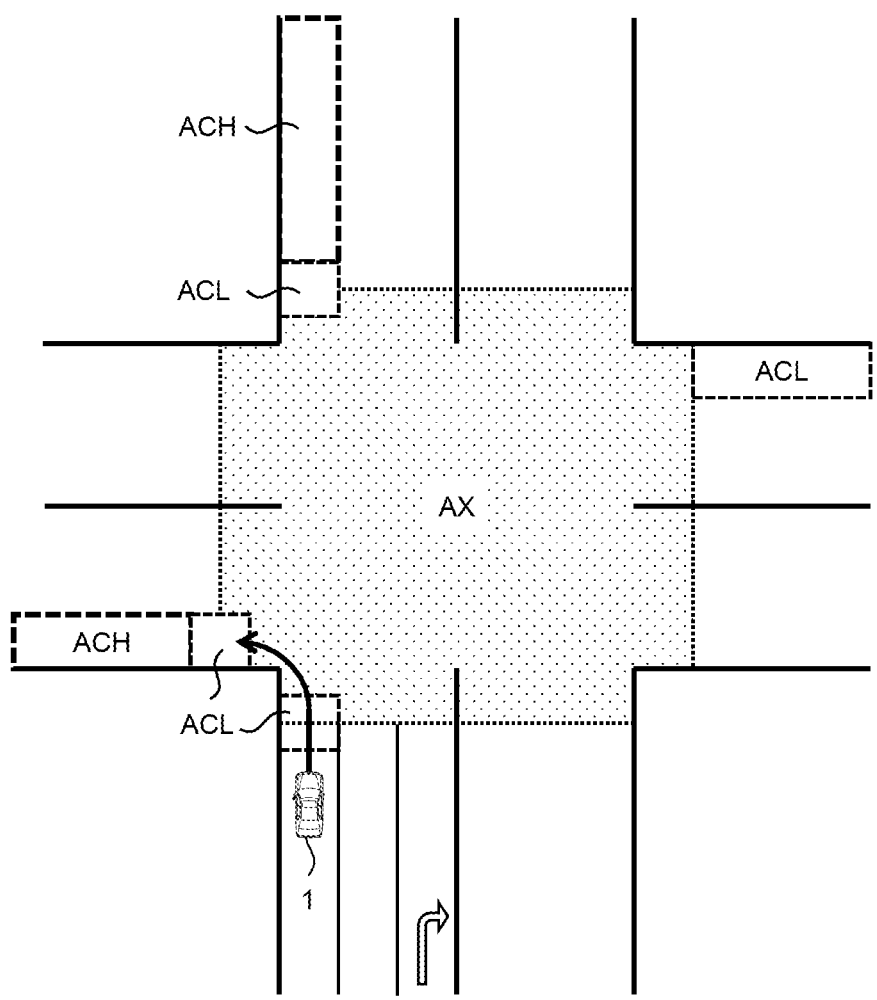
FIG. 15 is a conceptual diagram for explaining a third example of setting of the high-priority area and the low-priority area in the third embodiment of the present disclosure.

As another example, FIG. 15 shows a case where the vehicle 1 exists in a straight/left-turn lane before an intersection. In this case, the high-priority area ACH is set within a lane in the straight direction and a left-turn destination lane.

The control device 100 can recognize in which lane the vehicle 1 exists based on the vehicle position information 210 and the map information 250. A default value of the priority of each stop candidate area AC is registered in the map information 250. The control device 100 increases or decreases the priority of each stop candidate area AC from the default value according to the lane in which the vehicle 1 exists.

As described above, according to the third example, the high-priority area ACH and the low-priority area ACL around an intersection dynamically change according to a lane in which the vehicle 1 exists before entering the intersection. It is thus possible to more finely determine the target stop position PTS according to a situation at the time of the failure occurrence.

What is claimed is:

1. A vehicle control system that controls a vehicle, the vehicle control system comprising:
   a memory in which driving environment information indicating a driving environment for the vehicle is stored; and
   a processor programmed to:
   execute automated driving control that controls automated driving of the vehicle based on the driving environment information; and
   execute emergency stop control that stops the vehicle, when a part of functions of the vehicle is failed during the automated driving, wherein
   in the emergency stop control, the processor is further programmed to:
   acquire failure status information being information on the failed part of functions;
   determine, based on the failure status information and the driving environment information, a target stop position at which even the vehicle with the failed part of functions is able to arrive and stop by the automated driving; and
   execute the automated driving control such that the vehicle travels toward the target stop position to stop at the target stop position,
   the driving environment information includes map information,
   a stop candidate area being a candidate for an area at which the vehicle is made to stop when a failure occurs in the vehicle is registered in the map information,
   the processor determines the target stop position such that the target stop position is included in the stop candidate area registered in the map information,
   a priority is set for each stop candidate area,
   a high-priority area is the stop candidate area whose priority is a first priority,
   a low-priority area is the stop candidate area whose priority is a second priority lower than the first priority,
   when both the high-priority area and the low-priority area are qualified to be the target stop position, the processor determines the target stop position such that the target stop position is included in the high-priority area, and
   a road curvature in the high-priority area is lower than a road curvature in the low-priority area.

2. The vehicle control system according to claim 1, wherein
   a margin width is a difference between a vehicle width of the vehicle and a road width of a road area through which another vehicle traveling in a same direction as the vehicle is able to pass, and
   the margin width in the high-priority area is larger than the margin width in the low-priority area.

3. The vehicle control system according to claim 1, wherein
   the high-priority area and the low-priority area around an intersection change according to a lane in which the vehicle exists before entering the intersection.

4. The vehicle control system according to claim 1, wherein
   the processor is further programmed to:
   acquire vehicle performance information indicating a performance of the vehicle with the failed part of functions indicated by the failure status information; and
   determine, based on the performance of the vehicle and the driving environment information, the target stop position at which the vehicle with the failed part of functions is able to arrive and stop by the automated driving.

5. A vehicle control method that controls a vehicle, the vehicle control method comprising:
   executing automated driving control that controls automated driving of the vehicle based on driving environment information indicating a driving environment for the vehicle, the driving environment information includes map information;

executing emergency stop control that stops the vehicle, when a part of functions of the vehicle is failed during the automated driving, wherein executing the emergency stop control includes:
- acquiring failure status information being information on the failed part of functions;
- determining, based on the failure status information and the driving environment information, a target stop position at which even the vehicle with the failed part of functions is able to arrive and stop by the automated driving; and
- executing the automated driving control such that the vehicle travels toward the target stop position to stop at the target stop position, determining the target stop position such that the target stop position is included in a stop candidate area registered in the map information, the stop candidate area being a candidate for an area at which the vehicle is made to stop when a failure occurs in the vehicle is registered in the map information, setting a priority for each stop candidate area, a high-priority area is the stop candidate area whose priority is a first priority, and a low-priority area is the stop candidate area whose priority is a second priority lower than the first priority, and when both the high-priority area and the low-priority area are qualified to be the target stop position, determining the target stop position such that the target stop position is included in the high-priority area, wherein a road curvature in the high-priority area is lower than a road curvature in the low-priority area.

* * * * *